United States Patent
Ribner et al.

[15] 3,696,673
[45] Oct. 10, 1972

[54] METHOD AND MEANS OF MEASURING VELOCITY FLUCTUATIONS IN UNSTEADY FLOW

[72] Inventors: Herbert S. Ribner, Willowdale, Ontario; Thomas E. Siddon, Don Mills, Ontario, both of Canada

[73] Assignee: The Governors of the University of Toronto

[22] Filed: April 1, 1968

[21] Appl. No.: 717,846

[52] U.S. Cl. ................................................73/194 B
[51] Int. Cl. .................................................G01f 1/00
[58] Field of Search ............73/147, 194, 228, 194 B

[56] References Cited

UNITED STATES PATENTS 2,917,922  12/1959  Morse..........................73/228
2,918,816  12/1959  Ormond......................73/147
3,019,643  2/1962   Curry..........................73/147
3,241,360  3/1966   Curry..........................73/147

*Primary Examiner*—Richard C. Queisser
*Assistant Examiner*—Herbert Goldstein
*Attorney*—Douglas S. Johnson

[57] ABSTRACT

A gauge for measuring flow unsteadiness comprising a lift-sensor element having a lift-sensing surface to be presented to flow velocity disturbances perpendicular to a main stream flow to develop a time varying lift force with corresponding displacement responsive to time variations of the velocity disturbances, and means to translate the displacement variations into an alternating current to operate an indicator, and the method of measuring flow unsteadiness utilizing the principle of lift-sensing to detect flow velocity disturbances.

12 Claims, 10 Drawing Figures

PATENTED OCT 10 1972

Inventors
HERBERT S. RIBNER
THOMAS E. SIDDON by: Douglas S. Johnson  Agent

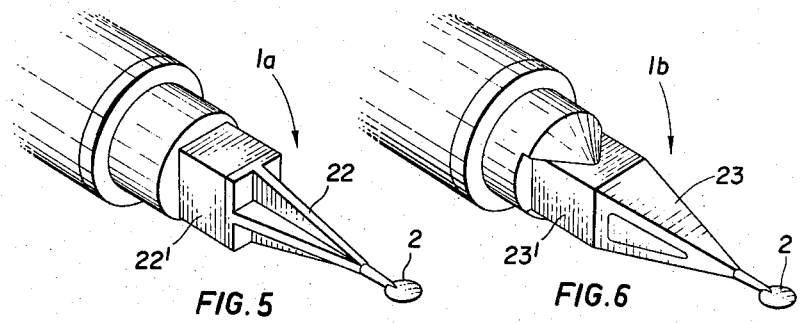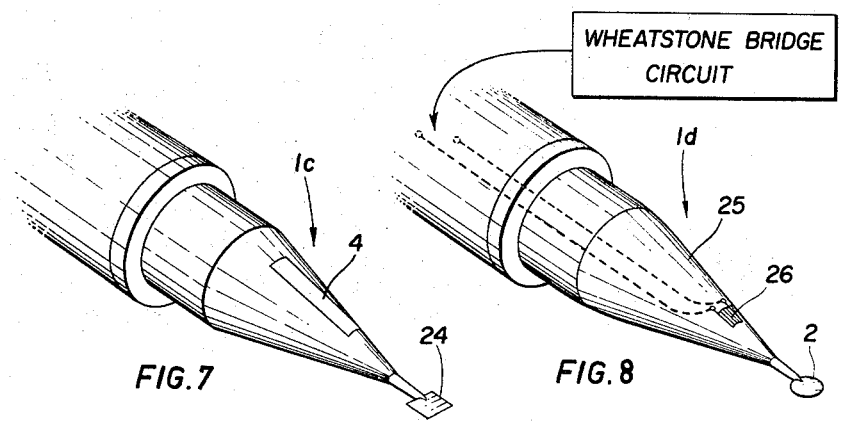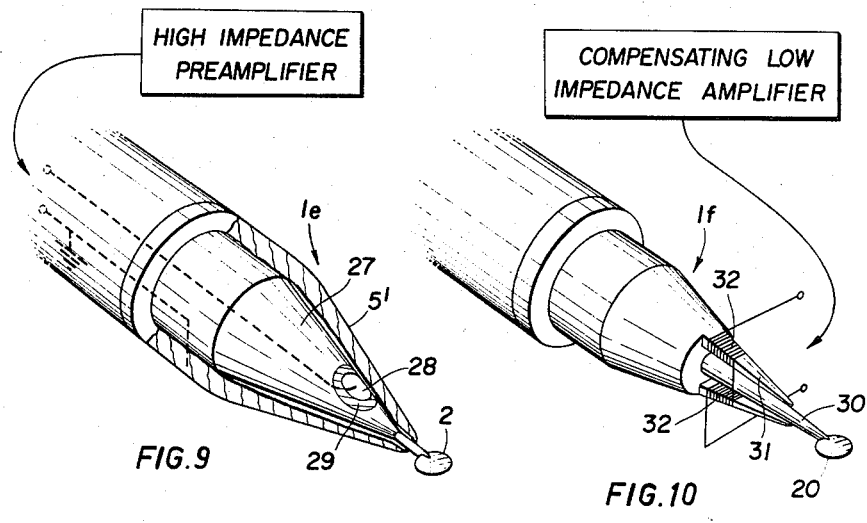

METHOD AND MEANS OF MEASURING VELOCITY FLUCTUATIONS IN UNSTEADY FLOW

This invention relates to a new method and means of measuring flow unsteadiness including turbulence in fluid flow.

Turbulence and other unsteadiness in fluid flow is an important consideration in many widely diversified problems. For instance, in the design of aircraft or other devices, or apparatus which move in air or other fluids, or around which air or other fluids flow, or in the transmission of fluids themselves such as gas, oil or the like in pipelines, it is often important to determine the fluid flow fluctuations described by changes in the magnitude and/or direction with time of the flow velocity vector, that is the unsteadiness of the fluid flow.

At present the accepted method of measuring instantaneous variations of the flow velocity vector magnitude and direction in air flow is an instrument known as a "hot wire anemometer." This device includes a pair of heated crossed wires arranged in the same plane but insulated from each other, which are placed in the stream flow. Any unsteadiness of the stream flow will cause a variation in the cooling effect the air has on the wires and through suitable dual channel circuitry the variations in cooling are detected and translated into a flow unsteadiness or turbulence measurement.

While a single hot "slant" wire single channel instrument is also used such instrument can only measure root-mean-square values, and cannot measure axi-symmetry of the stream turbulence.

In either case the instruments are complex and expensive and have many inherent limitations. For example, the instruments are subject to spurious results by virtue of changes in temperature of the stream flow. The fine hot wires used in the instrument require meticulous handling and are effected by dust or other particles and by corrosive atmospheres so that they can only be used under very specific conditions where the stream flow is clean and non-corrosive.

Moreover not only is the original expense of the instrument often prohibitive but the replacement of the wires is a delicate and expensive task requiring very great skill so that they cannot be replaced by ordinary technicians. Of major importance is the fact that the special circuitry required to give intelligence to the temperature variations of the hot wires is complex and very expensive.

While further special provisions can be made to provide measurements under adverse conditions of stream flow temperature and corrosiveness, such as providing a hot film in place of a hot wire sensor, such equipment is even more complex and expensive than the hot wire anemometer.

It is, therefore, the object of the present invention to provide a simple, rugged, highly reliable and relatively inexpensive instrument for directly measuring instantaneous or r.m.s. values of flow unsteadiness. More particularly it is an object to provide a low cost simple and accurate instrument that can be used to measure turbulence and/or other unsteadiness under wide conditions of stream temperature, corrosiveness and particle content whereby the instrument will have broad application in all types of fluid flow.

Again it is an important object to provide an instrument as aforesaid which will enable axi-symmetry of stream turbulence to be measured simply and easily by rotation of the instrument.

Again it is an object to provide not only a very simple, rugged and inexpensive flow unsteadiness sensor which can safely be exposed to essentially all types of fluid but to enable the sensor response to be translated into intelligent information using very simple and common place circuitry.

According to the invention the flow unsteadiness or turbulence is measured by utilizing a sensing element that develops a lift force directly proportional to the local time varying velocity vector component perpendicular to the stream flow, said element being supported to displaceably respond to the developed lift force sufficiently to excite a transducing device to generate a fluctuating or alternating voltage or current signal, and measuring the signal.

These and other objects and features will become apparent from the following detailed description taken in conjunction with the accompanying drawings in which.

FIGS. 5, 6, and 7 are perspective views of alternative structural forms of probe structures for use in gauges in accordance with the invention.

FIG. 8 is a perspective view of a further form of probe embodying a strain gauge.

FIGS. 9 and 10 are part sectional part perspective views illustrating additional forms of probes utilizing alternative forms of transducers.

In any stream there may be unsteady flow disturbances which may consist of single events, and/or periodic, and/or random fluctuations. A large class of disturbances are characterized as a time varying flow velocity vector superimposed on the main flow and whose instantaneous components perpendicular the main stream are usually called "v" and "w" and whose component parallel to the stream direction is called "u." The present invention provides a novel method and means of measuring components "v" and/or "w" for purposes of flow diagnostics.

Figure 1:
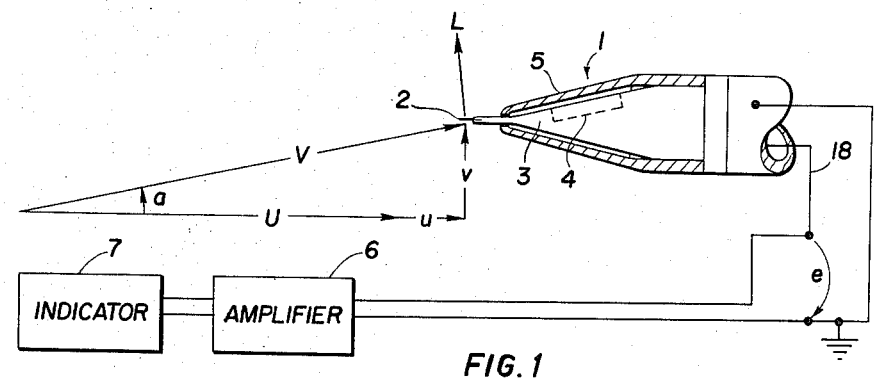
FIG. 1 is a part broken away vertical sectional and part diagrammatic view illustrating a flow unsteadiness gauge incorporating the invention and illustrating the principle upon which it operates.

In carrying out the measurement of flow unsteadiness according to the invention, the invention provides a simple instrument diagrammatically illustrated in FIG. 1. The detecting portion of the instrument comprises a probe, generally designated at 1, consisting of a flow sensing element 2 which is adapted to produce an appreciable lift force under flow impingement, hereinafter referred to as a lift-sensor. This lift-sensor 2 is supported at the free end of a cantilever beam 3 which incorporates or has associated with it a transducing element 4. Preferably the beam is protected from exterior forces other than applied through the sensor 2 by a shroud 5. The arrangement is such that under a lift force L on the sensor 2 provided for example, by the instantaneous "v" component of the time varying incremental flow velocity vector perpendicular to the main stream, the cantilever 3 will be displaced. This displacement which should be minute relative to the dimensions of the sensor for accurate measurements will vary with time in accordance with the time varying lift forces to produce through the transducing element 4 an alternating voltage "e" which can be applied to an a.c. amplifier 6 connected to a suitable indicating or measuring device 7. The indicating or measuring device 7 may, for example, be an oscilloscope to illustrate the instantaneous velocity vectors perpendicular to the stream flow or it may be an r.m.s. meter to indicate the r.m.s. value of such components, and suitable recording equipment, not illustrated, may be employed as desired for permanent recording.

As an explanation of the operation of the instrument designated in FIG. 1, the lift-sensor 2 comprises a flat surface and may be considered an aerofoil and simple aerodynamic theory can be applied in the consideration of the translation of the time varying instantaneous velocity vector components perpendicular to the main stream into a proportional fluctuating force which can be transduced into an a.c. voltage "e."

In this connection, with reference to the vector diagram portion of FIG. 1, it will be understood that the vector V is intended to represent the instantaneous local resultant velocity, whereas the vector "v" represents the component of V perpendicular to the plane of the lift-sensor or aerofoil 2. The resultant velocity V is therefore incident to the plane of the lift-sensor or aerofoil at an angle of attack $\lambda$. In unsteady flow, "v" and $\lambda$ vary together. At any instant of time the approximation of quasi-steady linear aerofoil theory can be applied, provided that the frequency is not too high. Thus the lift on the aerofoil L can be designated as follows:

$$L = \tfrac{1}{2}\rho V^2 S [dC_L/d\lambda]\lambda$$

Where L, V, $\lambda$ are as above, $\rho$ is the density, S is the lifting area of the aerofoil and $dC_L/d\lambda]$ is the lift curve slope of the aerofoil.

To a consistent approximation (that is for low intensity turbulence —$\lambda$ small), $\lambda$ may be replaced by (v/U) and V by U to give:

$$L = \tfrac{1}{2} \rho U S [dC_L/d\lambda].v$$

Where U is the local time average flow velocity as indicated in FIG. 1, essentially parallel to which the plane of the lift-sensor 2 is arranged.

From simple aerodynamic theory it is known that up to a certain angle of attack $\lambda$ stall, the lift-curve slope $dC_L/d\lambda$ is essentially constant. Furthermore, the response of standard transducing devices which may be used such as the transducing element 3 is normally linear over a wide range. Thus, in the range that the above limitations are met, or more exactly in the range that the overall probe response is linear in the lift L the result is a voltage proportional to "v," that is:

$$e = KCv$$

Where K is the appropriate constant of proportionality.

Figure 2:
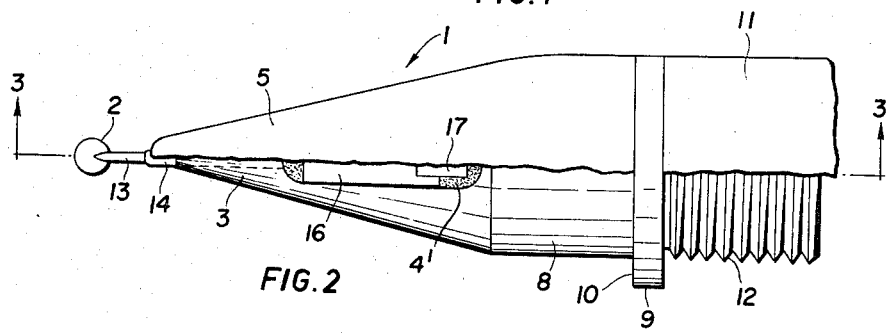
FIG. 2 is an enlarged plan view of the gauge of FIG. 1 with one half of the shroud removed.
Figure 3:
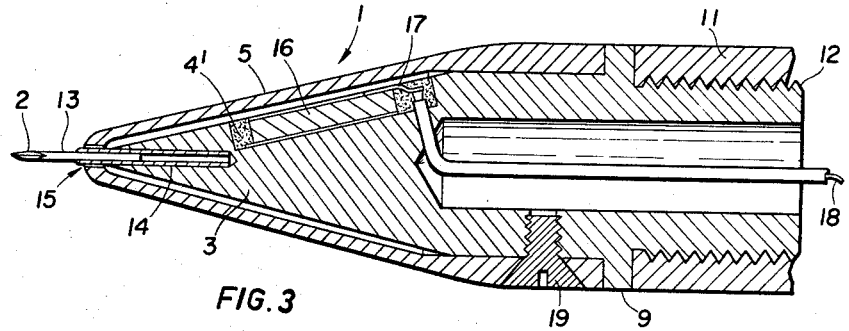
FIG. 3 is a mid-vertical sectional view on the line 3—3 of FIG. 2.

FIGS. 2 and 3 illustrate in further detail the probe 1 illustrated in FIG. 1 and shows the cantilever beam 3 as comprising a conical extension of a hollow cylindrical block 8 having a peripheral flange 9 against one shoulder 10 of which the corresponding conical shroud 5 abuts and against the other shoulder which a handle or sleeve 11 abuts, the shroud being secured by screw 19 and the sleeve being threaded over the threaded outer end 12 of the block 8. The lift-sensor or aerofoil 2 is shown as being of flat circular or disc shape and is mounted at the end of a needle-like stem 13 which is embedded in the outer end of the conical cantilever beam 3 to form a projection of the axis thereof. Surrounding the stem 13 is a tubular sleeve 14 which projects outwardly beyond the end of the beam 3 and through a central opening 15 in the shroud 5 to increase the rigidity of the connection between the lift-sensor 2 and the beam 3.

The transducing element 4 comprises piezoelectric element, electroded top and bottom as at 16 with one electrode connected as at 17 to an insulated conductor 18 with the lower electrode being grounded to the support constituted by the block 8.

The block 8 including its cantilever beam extension 3 may be formed of suitable material such as aluminum or steel as may be the lift-sensor 2 but the stem 13 is preferably steel. The shroud 5 and sleeve 11 may also be formed of any suitable rigid material.

The piezoelectric element or crystal 4 is actually embedded in the cantilever beam 3 and is anchored by a suitable material such as epoxy resin 4' and it will be understood that time varying lift forces developed by the lift-sensor 2 will produce a corresponding time varying incremental displacement of the cantilever beam 3 relative to its anchorage as formed by the block 8, whereby the piezoelectric crystal 4 will be subjected to time varying compression and tension to produce an alternating voltage "e" between the insulated line 18 and ground as constituted by the block 8.

The alternating voltage "e" is then applied to the a.c. amplifier 6 which may be a simple audio frequency amplifier impedance matched to the output of the crystal 4 since the frequency range over which it is desired to measure the "v" component is, in most instances, within the audio frequency range.

It will be understood that the invention discards any constant lift force on the lift-sensor because such steady state force or displacement which will not produce an alternating voltage and will not produce an output signal through from the amplifier 6 to the indicating or measuring device 7.

While the above discussion has referred to the time varying instantaneous velocity vector "v," it will be appreciated that by axially rotating the probe through 90° the corresponding measurement of the velocity vector "w" may be obtained. Thus, the instrument provides a ready means of measuring the axi-symmetry of the stream turbulence.

It will be understood that the particular details of the probe may vary according to the application requirements. For example, the lift-sensor or aerofoil 2 should not be larger than the spatial details of the flow unsteadiness it is to resolve and not so small that the signal-to-noise ratio is undesirably low. Thus, for example, in the measurement of turbulence near the end of the mixing region of a four inch jet with local mean velocity U of the order of 100 feet per second, it has been found that an aerofoil having a diameter of 1.8 millimeters provides excellent results. For other applications other suitable dimensions will, of course, be chosen.

Again the shape and structure of the cantilever beam 3 can be varied. For precise measurements, it is desirable that the resonant frequency of the beam be higher than the range of frequencies of unsteadiness to be measured by the instrument. The conical beam of FIGS. 1, and 3 has a fundamental resonant frequency above 10,000 cycles per second, so that the instrument illustrated is adapted for measurements of flow velocity fluctuations up to the order of 10,000 cycles per second.

Figure 4:
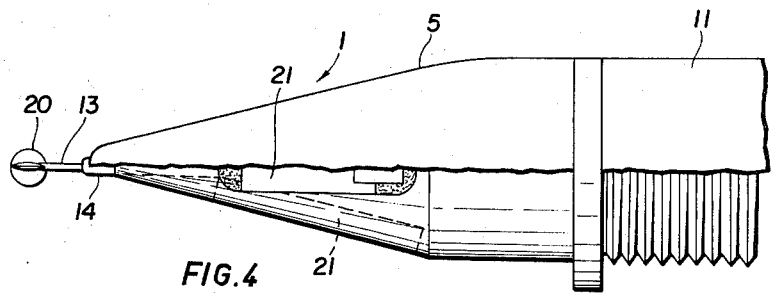
FIG. 4 is a view similar to FIG. 2 but showing an alternative form of gauge with a cruciform lift sensing element or aerofoil arrangement and provided with a pair of transducers arranged in 90° relation.

FIG. 4 illustrates a probe similar to FIGS. 2 and 3 with the exception that the lift-sensor 20 is of cruciform configuration and the beam 3 is provided with two transducers 21 in 90° relationship. The output of each transducer will produce its own voltage "e" which can be amplified and measured independently to give a measure of the separate "v" and "w" components. Alternatively, the two voltages may be combined to produce, for example, a signal proportional to the instantaneous sum of the two vector components "v" and "w," or any other desired combination.

FIG. 5 illustrates a probe 1a in which the configuration of the cantilever beam 22 supporting the lift-sensor 2 is of cruciform shape. A cubical type of piezoelectric transducer 22' is employed.

FIG. 6 shows a probe 1b generally similar to the probe 1 but in which the beam 23 is of wedge shape, and employs a cubical transducer 23'.

FIG. 7 shows a probe 1c in which the beam is conical corresponding to the beam 3 but the lift-sensor 24 is rectangular.

It will be understood that, while simple shapes are preferred for the lift-sensor 2, results can be achieved by various sensor geometrics provided they present an effective lift developing area.

While the piezoelectric crystal 4 is a convenient and simple transducing element for use with the invention, it will be understood that any device which will translate the mechanical incremental displacements of the sensor support into an alternating current voltage or signal may be utilized. For example, FIG. 8 illustrates a probe 1d in which the cantilever beam 25 has a strain gauge 26 bonded to the surface thereof, the output of which is connected to a suitable wheatstone bridge, not shown, to provide a response in accordance with beam displacement under a lift force developed at the sensor 2.

FIG. 9 illustrates a further form of probe 1e in which the displacement of the beam 27 through lift forces developed at the sensor 2 is utilized to effect the change in capacitance of a condenser formed by a condenser plate 28 which is preferably threadably adjusted on the beam 27 within an insulating ring 29 in close adjustable proximity to the shroud 5'. The shroud 5' forms the other plate of the condenser and the capacitance is altered by varying the airgap between the condenser plate 28 and shroud 5' by displacement of the beam 27. If the airgap is polarized by a constant voltage the fluctuating capacitance resulting from the fluctuating movement of the beam 27 produces an alternating current electrical output which may be delivered to a high impedance preamplifier, for example a cathode follower, (not shown) for amplification and subsequent display.

FIG. 10 illustrates a probe 1f employing a variable reluctance transducer to operate in a manner similar to a magnetic phonograph cartridge which translates needle vibration into voltage. In this case the stem 30 comprises a permanently magnetized member or a d.c. electromagnet and constitutes itself the displaceable beam support for the sensor 2 and serves as one pole of an airgap in a polarized magnetic circuit. Motion of the beam 30 in response to flow unsteadiness varies the airgap between the stem additively connected or beam 30 and the stem support 31 which carries a pair of coils 32. Fluctuations of the stem or beam 30 under lift forces developed by the sensor 2 will thus produce additive signals from the coils 32. When the output of these coils is connected to a suitable low impedance circuit a signal voltage will be provided which is directly proportional to the rate of displacement of the stem or beam 30, rather than proportional to the degree of displacement as is the case in the types of probes described in FIGS. 2, 8 and 9.

While several of the modifications in the arrangement and details of the parts have been illustrated, it will be understood that various other modifications may be made without departing from the spirit of the invention or scope of the appended claims.

It will therefore be understood that by conventional instantaneous electronic integration the output signal of the coils 32 is transformed into a signal proportional to the "v" component of unsteady flow velocity.

We claim:

1. A gauge for measuring the flow unsteadiness or the like comprising a rigidly supported unitary cantilever beam, lift-sensor means rigidly direct coupled to said beam and presenting a surface to be exposed to flow velocity disturbances perpendicular to a main stream flow to develop time varying lifting forces on said cantilever beam to effect time varying beam displacements in response to rapid time variations in such velocity disturbances; means rigidly direct coupled to said beam to translate time varying beam displacements into an alternating current signal, and indicator means responsive to said alternating current signal, said beam being internally uninterrupted between the points of coupling of said direct coupled lift sensor and translating means and having a fundamental resonant frequency greater than the frequency of the time varying lift force corresponding to the highest frequency velocity disturbance time variation to be measured.

2. A gauge as claimed in claim 1 in which said translating means comprises a transducer providing an alternating current signal in response to changes in beam displacement with time, while ignoring time independent beam displacement.

3. A gauge as claimed in claim 2 in which said transducer is a piezoelectric element associated with said beam.

4. A gauge as claimed in claim 3 in which said piezoelectric element is embedded in said beam.

5. A gauge as claimed in claim 2 in which said transducer is a strain gauge connected to said beam.

6. A gauge as claimed in claim 2 in which said transducer is a capacitance associated with said support and providing variations in airgap corresponding to variations in beam displacement.

7. A gauge as claimed in claim 2 in which said transducer comprises a magnetic reluctance device associated with said beam and providing a reluctance path variably corresponding to variations in support displacement.

8. A gauge as claimed in claim 2 in which an a.c. amplifier is provided to amplify the a.c. signal generated by said transducer.

9. A gauge as claimed in claim 8 in which said indicator means comprises an oscilloscope.

10. A gauge as claimed in claim 8 in which said indicator means comprises an r.m.s. meter.

11. A gauge as claimed in claim 1 in which protective shroud means are provided to enclose said beam and isolate same from external forces except those applied through said lift-sensor.

12. A gauge as claimed in claim 1 in which said beam has a resonant frequency above about 10,000 cycles per second.

* * * * *